United States Patent Office 3,558,742
Patented Jan. 26, 1971

3,558,742
CARBOXY TERMINATED POLYLACTAM AND A DIEPOXIDE
Rolf Schmid, Muenchenstein, Friedrich Lohse, Allschwil, and Hans Batzer, Arlesheim, Switzerland, assignors to Ciba Limited, Basel, Switzerland, a company of Switzerland
No Drawing. Filed Aug. 30, 1968, Ser. No. 756,354
Claims priority, application Switzerland, Sept. 11, 1967, 12,701/67
Int. Cl. C08g 45/12
U.S. Cl. 260—830        13 Claims

ABSTRACT OF THE DISCLOSURE

A curable composition which can be converted into crystalline plastics at an elevated temperature, characterized in that it contains long-chain polyamide-dicarboxylic acids of the formula

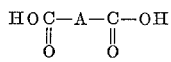

where A represents a polyamide residue which contains at least 2 carboxylic acid amide groups and in which branched or linear alkylene and/or alkenylene residue alternate with the carboxylic acid amide groups, as well as diepoxy compounds and, if desired, also antioxidants, and in which for every epoxide group equivalent 0.7 to 1.2, preferably 0.9 to 1.0 equivalent of carboxyl groups is present.

---

It is known that crosslinked plastics having considerable flexibility are obtained by the polyaddition of long-chain aliphatic dicarboxylic acids on to polyepoxides, for example polyglycidyl ethers of bisphenol A. This procedure is governed by the rule that the flexibility of the products increases as the share of the aliphatic chains is increased. However, the products become increasingly softer and finally have only moderate elongation at rupture combined with a very minor mechanical strength.

It has now been found that by the polyaddition of certain long-chain polyamide-dicarboxylic acids, whose chain contains alternating carboxylic acid amide groups, on to diepoxides novel plastics are obtained incorporating an unexpected combination of mechanical and physical properties that is advantageous for many industrial uses.

The incorporation of polyamide-dicarboxylic acids introduces into the three dimensionally crosslinked final product regular structural elements with hydrogen bridges, which renders these novel plastics crystalline and tough within a relatively wide temperature range and imparts to them a surprisingly high tensile strength combined with a high elongation at rupture. The high tensile strength thus achieved remains intact up to temperatures between 140 and 170° C. The long-chain dicarboxylic acids used for the polyaddition must satisfy certain structural preconditions:

They must be composed of branched or linear alkylene or alkenylene chains alternating with carboxylic acid amide groups. The stoichiometric portions of the reactants must further be chosen so that for every equivalent of epoxide groups of the diepoxy compound 0.9 to 1.5 equivalents of carboxyl groups of the polyamide-dicarboxylic acid are used.

Accordingly, the present invention provides a process for the manufacture of crystalline polyadducts, characterized in that polyamide-dicarboxylic acids of the formula (I)          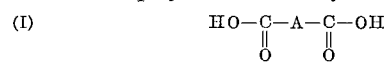

in which A represents a polyamide residue containing at least 2, preferably 2 to 20 carboxylic acid amide groups, in which residue branched or unbranched alkylene and/or alkenylene chains alternate with the carboxylic acid amide groups—are reacted with diepoxy compounds at an elevated temperature to form polyadducts, these epoxy compounds preferably having an epoxide equivalent weight not exceeding 500, using for every equivalent of epoxide groups 0.6 to 1.2, preferably 0.8 to 1.0 equivalent of carboxyl groups.

Particularly suitable diepoxy compounds are the N,N'-diglycidyl compounds, such as the N,N'-diglycidyl hydantoins, which are derived from heterocyclic nitrogen bases and are extremely well compatible with polyamide-dicarboxylic acids.

The diepoxy compounds used may also be diglycidyl ethers or esters of the formula (II)

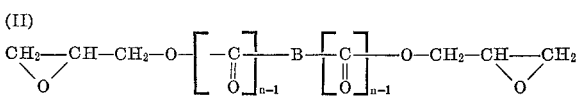

in which B represents a bivalent aliphatic, cycloaliphatic, araliphatic or aromatic residue and $n=1$ or 2.

When shaped structures prepared from the crystalline plastic products manufactured according to this invention are subjected to tensile stresses, they are stretched and during this mechanical processing their degree of crystallinity is raised.

The energy absorption capacity (=half the product of elongation at rupture × tensile strength, or area of the parallelogram resulting from the tensile strength test) is surprisingly high and surpasses that of the known epoxy resin products crosslinked with the conventional curing agents by a power of ten.

Compared with thermoplastic polyamides the systems of this invention have, in addition to the more favourable processing properties, the following considerable advantages:

The fully cured shaped structures have an increased resistance to creep and are rubber-elastic above the crystallization conversion temperature, whereas, for example the comparable thermoplastic polyamides turn liquid.

The hardness and especially the resilience in the rubber-elastic state of the shaped structures can be improved by increasing the crosslinking density; this is preferably achieved by adding a polycarboxylic acid anhydride and/or an excess of diepoxy compound, a tricarboxylic acid or a triepoxy compound.

When a polycarboxylic acid anhydride is used as crosslinking agent, it is in general preferable to use for every equivalent of carboxyl group of the dicarboxylic acid 0.05 to 0.5, especially 0.1 to 0.2 mol of a dicarboxylic acid anhydride and an excess of 0.05 to 0.5, especially 0.1 to 0.2 epoxide group equivalent of the diepoxy compound over and above the quantity needed for the reaction with the dicarboxylic acid, as a crosslinking agent for the polyadduct chain.

When a triepoxide is used as crosslinking agent it is as a rule advantageous to use 0.05 to 0.5, preferably 0.1 to 0.2 equivalent of epoxide groups of the triepoxy compound for every equivalent of epoxide groups of the diepoxy compound, and in this case an appropriate excess of polyamide-dicarboxylic acid must be used, that is to say the 0.6 to 1.2 equivalents of carboxyl groups of the polyamide-dicarboxylic acid used are in such a case referred to 1 epoxide equivalent of the mixture of the diepoxide with the triepoxide.

The use of more than 30 mol percent of crosslinking agent, referred to the carboxyl group equivalent of the dicarboxylic acid, should as a rule be avoided because this would greatly increase the crosslinking density and in general furnish shaped structures of insufficient elongation at rupture.

The crystalline plastics obtained by the present process probably consist of mainly linear high-molecular chain molecules of the polyadduct of diepoxide and polyamide-dicarboxylic acid.

In the crystalline products additionally crosslinked by the addition of a share of a crosslinking agent, especially a dicarboxylic acid anhydride, it is assumed that at least 0.05 and at most 0.5, especially 0.1 to 0.2 mol percent of the hydroxyl groups distributed along the polyadduct chains are in esterified form, every two such esterified hydroxyl groups from vicinal polyadduct chains being bound together through a bivalent organic residue so that a wide-mesh three-dimensional lattice of polyadduct chains with some linking points between the chains is formed.

However, it must be pointed out that even in the absence of an additional crosslinking agent a minor crosslinking occurs so that even these cured shaped structures are infusible.

Suitable polyamide-dicarboxylic acids of the Formula II for the manufacture of the new crystalline plastics are especially those of the general formula (III)

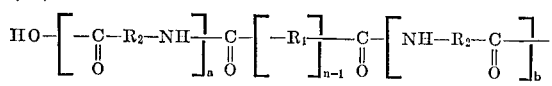

in which $R_1$ and $R_2$ is a branched or linear alkylene or alkenylene residue, $a$ and $b$ each being zero or a digit, the sum $(a+b)$ being at least 2, preferably 2–20 and $n=1$ or 2.

The polyamide-dicarboxylic acids of the Formula III can be manufactured by one of the following two synthetic routes:

Synthetic route 1

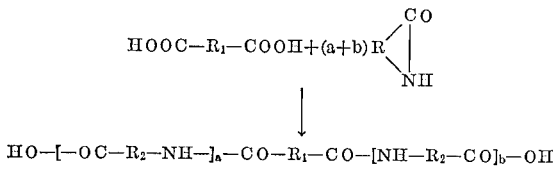

HO—[—OC—$R_2$—NH—]$_a$—CO—$R_1$—CO—[NH—$R_2$—CO]$_b$—OH

The aliphatic dicarboxylic acid HOOC—$R_1$—COOH used as central fraction is mixed with the amount of lactam, calculated to suit the desired chain length, of the general formula

and a catalyst. The reaction mixture is then heated for 3 to 15 hours, depending on the desired chain length generally for 10 to 12 hours, at 205–220° C. The reaction is performed in an autoclave under nitrogen. On completion of the reaction any unreacted lactam is distilled or sublimed out of the crude product. The yields are on an average very high.

Suitable starting materials are:

(a) Aliphatic dicarboxylic acids: oxalic, succinic, glutaric, methylglutaric, adipic, trimethyladipic, pimelic, suberic, azelaic, sebacic, fumaric, itaconic, citraconic acid; dimerized unsaturated fatty acids, such as dimerized linoleic or tall oil fatty acid.

(b) Lactams: β-lactams such as 4,4-dimethylazetidinone-2; pyrrolidone, ε-caprolactam, oenantholactam, ω-laurolactam and their derivatives substituted by alkyl groups (the substituents should not be attached to the N-atom of the lactam).

A specially suitable catalyst is concentrated phosphoric acid or water.

Synthetic route 2

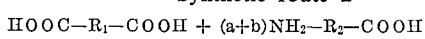

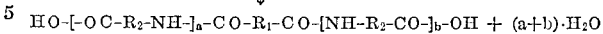

The manufacturing process is similar to route 1. The dicarboxylic acid is mixed with the ω-aminocarboxylic acid and heated under nitrogen at 220° C. until water is no longer being eliminated.

The resulting crude product may be used for the polyadduct formation with the diepoxide according to the present process as it is obtained.

The following are suitable as starting materials:

(a) Aliphatic dicarboxylic acids: as listed for route 1.

(b) ω-aminocarboxylic acids: the hydrolyzed lactams mentioned for route 1, more especially ω-aminocaproic acid and 11-aminoundecanoic acid.

Further suitable polyamide-dicarboxylic acids are those of the general formula (IV) 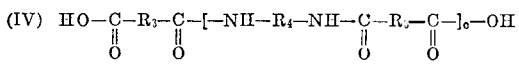

in which $R_3$ and $R_4$ each is a branched or linear alkylene or alkenylene residue, and $c$ is a digit, at least 1 and preferably from 1 to 10. The polyamide-dicarboxylic acids of the Formula IV are prepared in known manner by condensing an aliphatic dicarboxylic acid, such as succinic, adipic or sebacic acid, with the appropriate quantity of an aliphatic diprimary diamine, such as ethylenediamine, 1,3-propylenediamine, hexamethylenediamine or trimethyl-hexamethylenediamine. Instead of a mixture of the dicarboxylic acid and the diamine there may be used an acid salt of the two starting compounds, for example an acid salt of adipic acid and hexamethylenediamine ("AH"-salt).

As diepoxides to be reacted with the dicarboxylic acids of the Formula I according to the present process there may be specially used those whose molecular weight is not too high, using as a rule diepoxides having an epoxide equivalent weight not exceeding 500. Diepoxides having a relatively low molecular weight, especially those having an epoxide equivalent weight of about 100 to 250, are in general particularly suitable for the manufacture of crystalline products.

Especially suitable diepoxy compounds are those containing on an average more than one glycidyl group or 2,3-epoxycyclopentyl group linked with a hetero atom (for example sulphur or preferably oxygen or nitrogen); there may be mentioned specifically: bis-(2,3-epoxycyclopentyl)-ethers; basic diepoxy compounds, such as are obtained by reacting primary aromatic monamines, such as aniline, toluidine, or secondary aromatic diamines, such as 4,4′ - di - (monomethylamino) - diphenylmethane, with epichlorohydrin, β-methylepichlorohydrin or dichlorohydrin in the presence of alkali.

Preferred use is made of diglycidyl ethers or diglycidyl esters, especially N,N′-diglycidyl compounds derived from heterocyclic nitrogen compounds.

Diglycidyl esters particularly suitable for the reaction with the dicarboxylic acid of the Formula I according to the present process are those which are obtained by reacting a dicarboxylic acid with epichlorohydrin, β-methyl-epichlorohydrin or dichlorohydrin in the presence of alkali, such diesters may be derived from aliphatic dicarboxylic acids, such as succinic, adipic or sebacic acid, or from aromatic dicarboxylic acids such as phthalic, isophthalic or terephthalic acid, or especially from hydroaromatic dicarboxylic acids such as tetrahydrophthalic, hexahydrophthalic or 4-methylhexahydrophthalic acid. As examples there may be mentioned diglycidyl phthalate, diglycidyl terephthalate, diglycidyl tetrahydrophthalate and diglycidyl hexahydrophthalate.

The diglycidyl ethers used for the reaction with the dicarboxylic acid of the Formula I according to the present process are especially those obtained by etherifying a dihydric alcohol or diphenol with epichlorohydrin, β-methylepichlorohydrin or dichlorohydrin in the presence of alkali; these compounds may be derived from glycols such as ethyleneglycol, diethyleneglycol, triethyleneglycol, 1,3-propyleneglycol, 1,4-butanediol, 1,5-pentanediol, 1,6-hexanediol, from nitrogenous dialcohols such as N-phenyl-diethanolamine, and especially from diphenols such as resorcinol, pyrocatechol, hydroquinone, 1,4 - dihydroxy - naphthalene, bis - (p - hydroxyphenyl)-methane, bis - (p - hydroxyphenyl)-methylphenylmethane, bis - (p - hydroxyphenyl) - tolylmethane, 4,4'-dihydroxydiphenyl, bis-(p-hydroxyphenyl) - sulphone or preferably from bis-(p-hydroxyphenyl)-dimethlymethane.

There may be specially mentioned diglycidyl ethers derived from bis(p - hydroxyphenyl) - dimethylmethane (bisphenol A) which correspond to the average formula

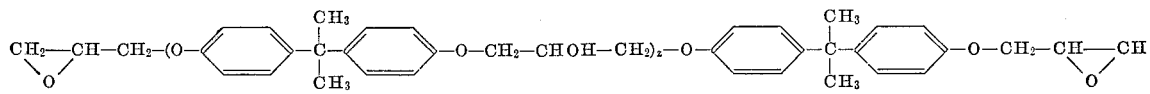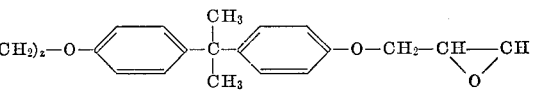

in which z is a small whole or fractional number, for example from 0 to 2.

As mentioned above, the N,N'-diglycidyl compounds derived from heterocyclic nitrogen compounds are distinguished by their specially good compatibility with the polyamide-dicarboxylic acids. Such preferably used N,N'-diglycidyl compounds are derived from heterocyclic nitrogen compounds containing more than one NH-group, for example ethylene-urea, propylene-urea, parabanic acid and especially from hydantoin or hydantoin derivatives, such as 5-monoalkyl - hydantoins or 5,5 - dialkyl-hydantoins. There may be mentioned, for example, N,N'-diglycidyl-ethylene-urea and especially N,N'-diglycidyl-5,5-dimethyl-hydantoin.

It is, of course, also possible to use mixtures of two or more of the diepoxides mentioned above. It has proved particularly useful to add an N-containing diepoxy compound, for example N,N'-diglycidyl-5,5-dimethylhydantoin to a conventional aromatic or cycloaliphatic diglycidyl compound and cycloaliphatic diepoxy compound.

As optional additional crosslinking agent there may be used, for example, a triepoxy compound such as triglycidylisocyanurate or N,N', N''-tri(β-glycidyl-hydroxypropionyl)-hexahydro-s-triazine or a tricarboxylic acid such as tricarballylic acid.

Particularly good results have been obtained with N-containing triepoxy compounds such as triglycidyl-isocyanurate, because they possess apart from a low vapour pressure good compatibility with the polyamide-dicarboxylic acids.

Further preferred crosslinking agents are dicarboxylic acid anhydrides, for example phthalic, Δ⁴-tetrahydrophthalic, hexahydrophthalic, 4-methylhexahydrophthalic, 3,6-endomethylene - Δ⁴ - tetrahydrophthalic, methyl - 3,6-endomethylene-Δ⁴-tetrahydrophthalic (=methyl nadic anhydride), 3,4,5,6,7,7-hexachloro-3,6-endomethylene-tetrahydrophthalic, succinic, adipic, azelaic, maleic, allylsuccinic, dodecenylsuccinic anhydride; 7-allylbicyclo(2.2.1)-hept-5-ene-2,3-dicarboxylic anhydride, pyromellitic dianhydride or mixtures of such anhydrides.

Among the above-mentioned polycarboxylic acid anhydrides the following have proved specially useful: hexahydrophthalic, Δ⁴-tetrahydrophthalic, 4-methylhexahydrophthalic, 4-methyl-Δ⁴ - tetrahydrophthalic, methylnadic and especially sebacic and dodecenylsuccinic anhydride.

According to the present invention the crystalline plastics are generally manufactured with simultaneous shaping to furnish castings, foam products, mouldings, lacquer films, laminates, adhesive bonds and the like. The procedure is this: A mixture of the dicarboxylic acid (I) and the diepoxide (II) and a possibly additionally used crosslinking agent (for example a dicarboxylic acid anhydride) is prepared, then poured into casting or press moulds, or brushed out to form coatings, or introduced into joints etc. and allowed to react at an elevated temperature until the plastic has been formed.

In the manufacture of shaped structures having a surface which is relatively large in relation to the mass, such as foils, coatings or the like, the additional use of an antioxidant, for example di-(tertiary butyl)-p-cresol may be advantageous.

Accordingly, the invention further includes moulding compositions which on heating furnish shaped structures, including two-dimensional flat structures, such as coatings or adhesive bonds, the said composition containing a polyamide-dicarboxylic acid of the Formula I and a diepoxide of the Formula II and, if desired, also an antioxidant and/or an additional crosslinking agent, especially a dicarboxylic acid anhydride.

The product contains for every equivalent of epoxide groups 0.8 to 1.1 equivalents of carboxyl group, when no additional crosslinking agent is present. When a dicarboxylic acid anhydride is used as crosslinking agent it is generally used in an amount of 0.05 to at most 0.3 mol for every equivalent of carboxyl groups of the dicarboxylic acid (I), and in this case the mixture should further contain an excess of 0.05 to 0.3 epoxide group equivalents of the diepoxy compound over and above the quantity required for the reaction with the dicarboxylic acid.

The diepoxide, the dicarboxylic acid and possible additives can, as a rule, be cast at an elevated temperature to form a low- to medium-viscous castable melt.

Within the melt the curing takes place, that is to say the conversion into the high-molecular crosslinked and infusible state within a short time, whereas the solid, crystalline resin+curing agent mixture can be stored at room temperature for a long time, that is to say for several months, without passing into the infusible state. Accordingly, the compositions of this invention are preferably suitable as powders for moulding compositions or coatings, for example for application by the flame-spraying or fluidized bed methods, or in form of solutions in an inert solvent as lacquer resins or paints for surface protection or for the manufacture of pre-impregnated tapes and fabric webs which are processed under pressure with heating to form laminates or shaped structures. Such shaped structures are distinguished by extreme toughness, which remains intact even at elevated temperatures.

Depending on the intended use the moulding compositions are admixed with additives such as fillers, reinforcing agents, anti-ageing substances (inhibitors), flame-proofing agents, dyestuffs or pigments.

As fillers or reinforcing agents there may be used fibrous or pulverulent, inorganic or organic substances. As inorganic fillers there may be mentioned quartz meal, hydrated alumina, mica, aluminium powder, iron oxide, ground dolomite, ground chalk, gypsum, ground slate, unburnt kaolin (bolus), burnt kaolin (registered trademark "Molochite") and as organic fillers wood meal and cellulose.

Suitable reinforcing agents are inorganic fibrous materials for example glass fibres, boron fibres, carbon fibres, asbestos fibres, or organic natural or synthetic fibres such as cotton, polyamide fibres, polyester fibres or polyacrylonitrile fibres. Substrates suitable for the manufacture of compressed materials or laminates are, for example, woven fabrics, braided or knitted fabrics, fibre mats or fibre fleeces or fibrous materials. There may be mentioned paper, cottonwool, linen or cotton paper, canvas and preferably asbestos paper, mica paper, mats or woven fabrics of high-melting synthetics and especially glass fibre mats and fabrics.

Such laminates may be used, for example, for the manufacture of motorbody components.

Furthermore, the moulding compositions may be used in the unfilled or filled state as dipping or casting resins, floor coverings, potting or insulating materials for the electrical industry, as adhesives, for examples in form of adhesive foils, and also for the manufacture of such products.

Unless otherwise indicated, percentages in the following examples are by weight.

For the manufacture of the crystalline plastics described in the examples the polyamide-dicarboxylic acids A–G described below were used:

Manufacture of the polyamide-dicarboxylic acids

Since, apart from minor variations, the principle of the manufacturing process is throughout the same, the following instruction is of a general nature. The starting materials and reaction conditions used and the final products obtained in each case are shown in the table.

Process

The starting materials in the amounts shown in the following Table I are mixed, the catalyst is added and the whole is heated under nitrogen in an autoclave at 210–220° C., during which the internal pressure reaches a maximum of 2 to 3 atmospheres (gauge). After lapse of the indicated reaction time the heating is removed, the batch allowed to cool and then heated in a sausage flask to 160–170° C. under 11 mm. Hg pressure. Any unreacted lactam and unreacted dicarboxylic acid are then distilled or sublimed out of the product. The melt is always dark reddish brown and the solidified final product is faintly olive coloured. The characteristic properties of the final product are shown in Table I.

The following properties were found:
Tensile strength according to ISO 468—400 kg./cm.$^2$
Elongation at rupture—270%
Crystallization conversion temperature, stretched—171° C.
Crystallization conversion temperature, unstretched—142° C.

Testing the crystallinity

The crystallization conversion temperatures were measured, as mentioned above, with a differential calorimeter. When a resin is heated at a constant rate and the crystals melt, the resin absorbs a great deal of energy within a relatively tight temperature range. The temperature at which a maximum of energy is absorbed is referred to as the crystallization conversion temperature. The method used was performed by measuring the energy directly instead of by way of a control via a temperature difference.

EXAMPLE 2

395 grams of polyamide-dicarboxylic acid B (acid equivalent weight 395 g.) were heated to 220° C. and mixed with 172 g. of tetrahydrophthalic acid diglycidyl ester (Example 1), which corresponds to a ratio of 1.1 equivalents of epoxide group for every equivalent of acid or carboxyl group respectively. After having been stirred for a short time the mixture was poured into the moulds preheated at 220° C. as described in Example 1 and heated for 45 minutes at 210° C. The mouldings revealed the following properties:
Tensile strength according to ISO 468—177 kg./cm.$^2$
Elongation at rupture—352%

EXAMPLE 3

788 grams of polyamide-dicarboxylic acid C (acid equivalent weight 788 g.) were heated to 220° C. and mixed with 172 g. of tetrahydrophthalic acid diglycidyl ester of Example 1, which corresponds to a ratio of 1.1 equivalents of epoxide group for every equivalent of acid

TABLE I.—POLYAMIDE-CARBOXYLIC ACIDS A–G: MANUFACTURING PROCESSES

| Starting materials | | | Reaction time in hours | Conditions temperature, °C. | Lactum distilled off at end, g. | Final products (polyamide-carboxylic acid) | | |
|---|---|---|---|---|---|---|---|---|
| Acid, grams | ε-Caprolactam grams | Catalyst | | | | Grams | Acid equivalent weight | Softening range, °C. |
| A, 117 adipic | 683 | 4 g. H$_2$O | 12 | 216–223 | 10.0 | 790 | 495 | 125–135 |
| B, 146 adipic | 654 | 4 g. H$_2$O | 12 | 216–218 | 10.0 | 781 | 395 | 150–155 |
| C, 73 adipic | 727 | 4 g. H$_2$O | 10 | 210–215 | 24.0 | 776 | 788 | 110–120 |
| D, 97 adipic | 703 | 4 g. H$_2$O | 12 | 216–219 | 3.0 | 797 | 598 | 150–160 |
| E, 146 adipic | 678 | 4 g. H$_2$O | 10 | 220 | 46.0 | 778 | 357 | 153–164 |
| F, 146 adipic | 226 | 2 g. H$_3$PO$_4$ (85%) | 10 | 220 | | 372 | 186 | Waxy |
| G, 162 sebacic | 772 | | 60 | 220 | 116.0 | 768 | 479 | 155–164 |

EXAMPLE 1

495 grams of polyamide-dicarboxylic acid A (acid equivalent weight of 495 g.) were heated to 220° C. and thoroughly mixed with 172 g. of tetrahydrophthalic acid diglycidyl ester containing 6.4 epoxide equivalents per kg., corresponding to a ratio of 1.1 equivalents of epoxide groups for every equivalent of acid or of carboxyl group respectively. The mixture was then poured into previously heated (220° C.) aluminum moulds (internal dimensions 13.5 x 13.5 x 0.1 cm.). After curing for 45 minutes at 210° C. the mouldings were taken out of the moulds and by means of a blanking tool test bodies according to ISO-Draft recommendation 468 (test body form No. 1) blanked out. The crystallization conversion temperature was measured with a differential scanning calorimeter (according to Perkin-Elmer), specimens for the test in the unstretched state being blanked out of the sheet, specimens for testing in the stretched state being taken from a portion of the test body subjected to a tensile stress.

or carboxyl group respectively. After having been stirred for a short time the mixture was poured into the moulds preheated at 220° C. as described in Example 1 and heated for 45 minutes at 210° C. The mouldings revealed the following properties:

Tensile strength according to ISO 468—370 kg./cm.$^2$
Elongation—130%.

EXAMPLE 4

598 grams of polyamide-dicarboxylic acid D (acid equivalent weight 598 g.) and 53.2 g. of dodecenylsuccinic anhydride were heated to 210° C. and intimately mixed, and then 203 g. of tetrahydrophthalic acid diglycidyl ester were added, which corresponds to a ratio of 0.2 equivalent of anhydride group and 1.3 equivalents of epoxide group for every equivalent of carboxyl group of the polyamide-dicarboxylic acid. After having been stirred for a short time the mixture was poured into the moulds preheated at 220° C. as described in Example 1 and heated for 45 minutes at 200° C. The mouldings revealed the following properties:

Tensile strength—300 kg./cm.²
Elongation at rupture—167%.
Crystallization conversion temperature in the stretched state—167° C.

EXAMPLE 5

357 grams of polyamide-dicarboxylic acid E (acid equivalent weight 357 g.) were mixed with 53.2 g. of dodecenylsuccinic anhydride and heated to 210° C. Then 203 g. of tetrahydrophthalic acid diglycidyl ester (Example 1) were added, which corresponds to a ratio of 0.2 equivalent of anhydride group and 1.3 equivalents of epoxide group for every equivalent of carboxyl group of the polyamide-dicarboxylic acid. After having been stirred for a short time the mixture was poured into the moulds preheated at 210° C. according to Example 1 and heated for 45 minutes at 200° C. The mouldings revealed the following properties:

Tensile strength—280 kg./cm.²
Elongation at rupture—315%.
Crystallization conversion temperature in the unstretched state—137° C.
In the stretched state—147° C.

EXAMPLE 6

788 grams of polyamide-dicarboxylic acid C (acid equivalent weight 788 g.) and 53.2 g. of dodecenylsuccinic anhydride were heated to 210° C. and then 203 g. of tetrahydrophthalic acid diglycidyl ester (Example 1) were added, which corresponds to a ratio of 0.2 equivalent of anhydride group and 1.3 equivalents of epoxide group for every equivalent of acid or carboxyl group respectively. After having been stirred for a short time the mixture was poured into the moulds preheated at 200° C. according to Example 1 and heated for 2 hours at 190° C. The mouldings revealed the following properties:

Tensile strength—385 kg./cm.²
Elongation at rupture—86%.

EXAMPLE 7

186 grams of polyamide-dicarboxylic acid F (acid equivalent weight 186 g.) and 53.2 g. of dodecenylsuccinic anhydride were heated to 190° C., and then 203 g. of tetrahydrophthalic acid diglycidyl ester were added, which corresponds to a ratio of 0.2 equivalent of anhydride group and 1.3 equivalents of epoxide group for every equivalent of acid or carboxyl group respectively. After having been stirred for a short time the mixture was poured into the moulds preheated at 200° C. according to Example 1 and heated for 2 hours at 180° C. The mouldings revealed the following properties:

Tensile strength—180 kg./cm.²
Elongation at rupture—270%.

EXAMPLE 8

479 grams of polyamide-dicarboxylic acid G (acid equivalent weight 479 g.) and 53.2 g. of dodecenylsuccinic anhydride were heated to 180° C. and then 203 g. of tetrahydrophthalic acid diglycidyl ester were added, which corresponds to a ratio of 0.2 equivalent of anhydride group and 1.3 equivalents of epoxide group for every equivalent of acid or carboxyl group respectively. The mixture was stirred for a short time and then poured into the moulds preheated at 200° C. according to Example 1 and heated for 2 hours at 180° C. The mouldings revealed the following properties:

Tensile strength—125 kg./cm.²
Elongation at rupture—200%.

EXAMPLE 9

495 grams of polyamide-dicarboxylic acid A (acid equivalent weight 495 g.) were heated to 220° C. and intimately mixed with 134 g. of crystalline N,N'-diglycidyl-5,5-dimethylhydantoin (containing 7.45 epoxide equivalents per kg.), which corresponds to a ratio of 1.0 equivalent of epoxide group for every equivalent of acid or carboxyl group respectively. The mixture was poured into the moulds preheated at 220° C. according to Example 1 and heated for 2 hours at 200° C. The mouldings revealed the following properties:

Tensile strength—515 kg./cm.²
Elongation at rupture—275%.
Crystallization conversion temperature in the stretched state—137° C.

EXAMPLE 10

242 grams of a bisphenol A-diglycidyl ether (which is liquid at room temperature and contains 5.35 epoxide equivalents per kg.; prepared by condensing epichlorohydrin with bis-(p-hydroxyphenyl)-dimethylmethane (=bisphenol A) in the presence of alkali) were intimately mixed at 210° C. with 395 g. of polyamide-dicarboxylic acid B (acid equivalent weight 395 g.) and with 53.2 g. of dodecenylsuccinic anhydride, corresponding to a ratio of 0.2 equivalent of anhydride group and 1.3 equivalents of epoxide group for every equivalent of acid or carboxyl group. The mixture was poured into the moulds preheated at 210° C. according to Example 1 and heated for 6 hours at 180° C. The mouldings revealed the following properties:

Tensile strength—367 kg./cm.²
Elongation at rupture—13.5%.

EXAMPLE 11

599 grams of polyamide-dicarboxylic acid D (acid equivalent weight 599 g.) were heated to 200° C. and intimately mixed with 172 g. of tetrahydrophthalic acid diglycidyl ester, corresponding to a ratio of 1.1 equivalents of epoxide group for every equivalent of acid or carboxyl group respectively. The mixture was poured into the moulds preheated at 210° C. according to Example 1 and heated for 2 hours at 200° C. The mouldings revealed the following properties:

Tensile strength—430 kg./cm.²
Elongation at rupture—200%.

EXAMPLE 12

495 grams of polyamide-dicarboxylic acid A (acid equivalent weight of 495 g.) were heated to 200° C. and thoroughly mixed with 125 g. of tetrahydrophthalic acid diglycidyl ester (containing 6.4 epoxide equivalents per kg.) and 23 g. of triglycidyl-isocyanurate (containing 9.84 epoxide equivalents per kg.), corresponding to a ratio of 0.8 equivalent of epoxide group of the diglycidyl compound +0.2 equivalent of epoxide group of the triglycidyl compound for every equivalent of carboxyl group of the dicarboxylic acid. The mixture was poured into moulds preheated at 200° C. according to Example 1 and heated for 2 hours at 200° C. The mouldings revealed the following properties:

Tensile strength—390 kg./cm.²
Elongation at rupture—230%.

EXAMPLE 13

198 grams of a bisphenol A-diglycidyl ether (which is liquid at room temperature and contains 5.35 epoxide equivalents per kg.; prepared by condensing epichlorohydrin with bis - (p - hydroxyphenyl) - dimethylmethane (=bisphenol A) in the presence of alkali) were thoroughly mixed at 210° C. with 598 g. of polyamide-dicarboxylic acid D having an acid equivalent weight of 598 g., which corresponds to a ratio of 1.07 equivalents of epoxide group of the diglycidyl compound for every 1.0 equivalent of carboxyl group of the dicarboxylic acid. The mixture was poured into the moulds preheated at 200° C. according to Example 1 and heated for 2 hours at 200° C. The mouldings revealed the following properties:

Tensile strength at 20° C.—385 kg./cm.²
  at 70° C.—335 kg./cm.²
Elongation at rupture at 20° C.—3.5%.
  at 70° C.—120%.

We claim:

1. A curable composition of matter which can be converted into a crystalline plastic material at an elevated temperature, which comprises (1) a long-chain polyamide-dicarboxylic acid of the formula

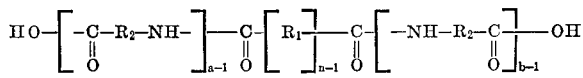

in which $R_1$ is a member selected from the group consisting of branched alkylene, linear alkylene, branched alkenylene and linear alkenylene residue and $R_2$ is a member selected from the group consisting of branched alkylene and linear alkylene $a$ and $b$ each are integers of at least 1, the sum $[(a-1)+(b-1)]$ being at least 2 and in which $n$ is an integer of at least 1 and at most 2, and (2) diepoxide, and in which composition for every epoxide group equivalent of diepoxide (2) 0.7 to 1.2 equivalent of carboxyl group of polyamide-dicarboxylic acid (1) is present.

2. A curable composition of matter according to claim 1 wherein for every epoxide group equivalent of diepoxide (2) 0.9–1.0—equivalent of carboxyl group of polyamide-dicarboxylic acid (1) is present.

3. A composition as claimed in claim 1, which further contains an antioxidant.

4. A composition as claimed in claim 1, containing a diepoxide (2) having an epoxide equivalent weight not exceeding 500.

5. A composition as claimed in claim 4 containing a diepoxide (2) having an epoxide equivalent weight of 100 to 250.

6. A composition as claimed in claim 1, containing a diepoxide (2) whose molecule contains on an average more than one member selected from the group consisting of glycidyl group and 2,3-epoxycyclopentyl group, said member being bound to a hetero atom.

7. A composition as claimed in claim 6, containing as diepoxide (2) an N,N'-diglycidyl derivative of a heterocyclic nitrogen compound containing more than one NH-group located in the ring.

8. A composition as claimed in claim 6 wherein the diepoxide (2) has the formula

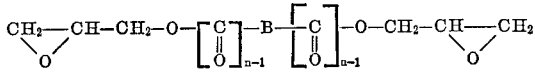

in which B represents a bivalent residues selected from the group consisting of aliphatic, cycloaliphatic, araliphatic and aromatic bivalent residue, and $n$ is an integer of at least 1 and at most 2.

9. A composition as claimed in claim 1, wherein in the formula for polyamide-dicarboxylic acid the sum $[(a-1)+(b-1)]$ is at least 2 and at most 20.

10. A curable composition of matter as claimed in claim 1, which contains additionally as crosslinking agent a dicarboxylic acid anhydride, and in which for every equivalent of carboxyl group of the polyamide-dicarboxylic acid (1), 0.05 to 0.5 mol of a dicarboxylic acid anhydride and an excess of 0.05 to 0.5 epoxide group equivalent of the diepoxide (2) over the quantity prescribed for the reaction with the polyamide-dicarboxylic acid alone, are present.

11. A composition as claimed in claim 10, wherein per equivalent of carboxyl group of the polyamide-dicarboxylic acid, 0.1 to 0.2 mol of a dicarboxylic acid anhydride and an excess of 0.1 to 0.2 epoxide group equivalent of the diepoxide over the quantity prescribed for the reaction with the polyamide-dicarboxylic acid alone, are present.

12. A composition as claimed in claim 1 which contains additionally as crosslinking agent a triepoxide, in which for every equivalent of epoxide group of the diepoxide (2), 0.05 to 0.5 equivalent of epoxide group of the triepoxide is present, and which composition further contains 0.6 to 1.2 equivalents of carboxyl group of the polyamide-dicarboxylic acid (1) for every equivalent of epoxide group of the mixture of the diepoxide+triepoxide.

13. A composition as claimed in claim 12, wherein per equivalent of the diepoxide 0.1 to 0.2 equivalent of epoxide group of the triepoxide is present.

References Cited

UNITED STATES PATENTS

| | | | |
|---|---|---|---|
| 3,336,415 | 8/1967 | Kennedy | 260—830 |
| 3,363,025 | 1/1968 | Fitko | 260—830 |
| 3,371,008 | 2/1968 | Lopez | 260—830 |
| 3,379,561 | 4/1968 | Manaka | 260—830 |
| 3,406,053 | 10/1968 | Jaenicke | 260—830 |
| 3,458,481 | 7/1969 | Reichold | 260—830 |
| 3,449,280 | 6/1969 | Frigstad | 260—830 |
| 3,462,337 | 8/1969 | Gorton | 260—830 |

PAUL LIEBERMAN, Primary Examiner

U.S. Cl. X.R.

260—2, 13, 18, 37, 45.95, 47, 78, 78.4, 835, 836, 837; 161—184, 185